(12) United States Patent
Kominami et al.

(10) Patent No.: US 12,522,355 B2
(45) Date of Patent: Jan. 13, 2026

(54) DISCHARGE APPARATUS AND UNMANNED AIRCRAFT

(71) Applicant: Toyo Seikan Co., Ltd., Tokyo (JP)

(72) Inventors: Atsushi Kominami, Kanagawa (JP); Souji Araki, Kanagawa (JP)

(73) Assignee: Toyo Seikan Co., Ltd., Tokyo (JP)

( * ) Notice: Subject to any disclaimer, the term of this patent is extended or adjusted under 35 U.S.C. 154(b) by 307 days.

(21) Appl. No.: 18/178,559

(22) Filed: Mar. 6, 2023

(65) Prior Publication Data
US 2023/0227160 A1 Jul. 20, 2023

Related U.S. Application Data

(63) Continuation of application No. PCT/JP2021/030318, filed on Aug. 19, 2021.

(30) Foreign Application Priority Data

Sep. 11, 2020 (JP) .................................. 2020-152862

(51) Int. Cl.
*B64D 1/18* (2006.01)
*B64U 10/14* (2023.01)
(Continued)

(52) U.S. Cl.
CPC ............... *B64D 1/18* (2013.01); *B64U 10/14* (2023.01); *B64U 30/20* (2023.01); *B65D 83/303* (2013.01);
(Continued)

(58) Field of Classification Search
CPC .... B64D 1/18; B64U 2101/45; B64C 39/024; B65D 83/386
See application file for complete search history.

(56) References Cited

U.S. PATENT DOCUMENTS 3,952,916 A * 4/1976 Phillips ................ B65D 83/386
222/162
4,238,055 A * 12/1980 Staar ................... B05B 11/1052
222/162
(Continued)

FOREIGN PATENT DOCUMENTS

CN 203799923 U 8/2014
CN 211190636 U 8/2020
(Continued)

OTHER PUBLICATIONS

Extended European Search Report for counterpart European Application No. 21866483.7, issued by the European Patent Office on Sep. 11, 2024.
(Continued)

*Primary Examiner* — Paul R Durand
*Assistant Examiner* — Randall A Gruby

(57) ABSTRACT

Provided is a discharge apparatus to which an aerosol container can be detachably mounted, the discharge apparatus including: a pressing unit configured to press a stem for opening and closing a valve of the aerosol container; and a buffer unit configured to buffer excess force, which is an amount of force by which force with which the pressing unit presses the stem has exceeded force to open the valve. The buffer unit may be configured to buffer the excess force exerted on the pressing unit by moving the pressing unit according to the excess force. The buffer unit may be configured to buffer the excess force exerted on the aerosol container by moving the aerosol container according to the excess force.

12 Claims, 20 Drawing Sheets

(51) Int. Cl.
  *B64U 30/20* (2023.01)
  *B65D 83/303* (2025.01)
  *B64U 101/28* (2023.01)
  *B64U 101/29* (2023.01)
  *B64U 101/45* (2023.01)

(52) U.S. Cl.
  CPC ...... *B64U 2101/28* (2023.01); *B64U 2101/29* (2023.01); *B64U 2101/45* (2023.01)

(56) References Cited

U.S. PATENT DOCUMENTS

| | | | | |
|---|---|---|---|---|
| 4,563,156 | A * | 1/1986 | Bissig | B63C 9/22 |
| | | | | 441/100 |
| 4,978,035 | A | 12/1990 | Morane | |
| 9,522,775 | B2 * | 12/2016 | Bellinger | B65D 83/567 |
| 9,776,200 | B2 * | 10/2017 | Busby | G05D 1/678 |
| 11,083,855 | B2 * | 8/2021 | Richardson | A61M 15/009 |
| 11,174,021 | B2 * | 11/2021 | Anderson | B60L 58/12 |
| 11,897,687 | B2 * | 2/2024 | Kominami | B64U 10/14 |
| 12,049,353 | B2 * | 7/2024 | Kominami | B05B 12/08 |
| 12,129,031 | B2 * | 10/2024 | Kominami | B65D 83/384 |
| 12,151,814 | B2 * | 11/2024 | Kominami | B05B 17/00 |
| 2007/0056585 | A1 * | 3/2007 | Davies | A61M 15/08 |
| | | | | 128/203.15 |
| 2016/0339464 | A1 | 11/2016 | Le Maner | |
| 2022/0096761 | A1 | 3/2022 | Fabien | |
| 2022/0177132 | A1 | 6/2022 | Kominami | |
| 2022/0194685 | A1 | 6/2022 | Kominami | |
| 2023/0025073 | A1 * | 1/2023 | Kominami | B05B 15/14 |
| 2023/0027548 | A1 * | 1/2023 | Kominami | B64C 39/024 |
| 2023/0191437 | A1 * | 6/2023 | Kominami | B65D 83/303 |
| | | | | 239/140 |
| 2023/0227160 | A1 * | 7/2023 | Kominami | B05B 15/14 |
| | | | | 222/173 |
| 2023/0356920 | A1 * | 11/2023 | Kominami | B05B 7/1686 |

FOREIGN PATENT DOCUMENTS

| | | |
|---|---|---|
| JP | 2006123913 A | 5/2006 |
| JP | 2012136265 A | 7/2012 |
| JP | 2012201387 A | 10/2012 |
| JP | 2012250716 A | 12/2012 |
| JP | 2016522013 A | 7/2016 |
| JP | 2018085239 A | 5/2018 |
| JP | 2019210148 A | 12/2019 |
| JP | 2020142772 A | 9/2020 |
| JP | 2020172321 A | 10/2020 |
| WO | 2009090245 A1 | 7/2009 |
| WO | 2020161423 A1 | 8/2020 |

OTHER PUBLICATIONS

Office Action issued for counterpart Taiwanese Application 110133683, transmitted from the Taiwan Intellectual Property Office on Dec. 12, 2024 (issued on Dec. 9, 2024).

Office Action issued for counterpart Chinese Application 202180054331.1, issued by The State Intellectual Property Office of People's Republic of China on Jun. 13, 2025.

International Search Report and (ISA/237) Written Opinion of the International Search Authority for International Patent Application No. PCT/JP2021/030318, mailed by the Japan Patent Office on Nov. 9, 2021.

* cited by examiner

DISCHARGE APPARATUS AND UNMANNED AIRCRAFT

The contents of the following Japanese patent applications are incorporated herein by reference:
NO. 2020-152862 filed in JP on Sep. 11, 2020
NO. PCT/JP2021/030318 filed in WO on Aug. 19, 2021

BACKGROUND

1. Technical Field

The present invention relates to a discharge apparatus and an unmanned aircraft.

2. Related Art

In the related art, a limit switch having an overtravel mechanism for absorbing excess force is known (for example, refer to Patent Document 1).
Patent Document 1: Japanese Patent Application Publication No. 2018-085239

DESCRIPTION OF EXEMPLARY EMBODIMENTS

Hereinafter, the present invention will be described through embodiments of the invention, but the following embodiments do not limit the invention according to the claims. In addition, not all of the combinations of features described in the embodiments are essential to the solving means of the invention.

As used herein, technical matters may be described with orthogonal coordinate axes consisting of an X axis, a Y axis, and a Z axis. The orthogonal coordinate system of the present example is a so-called right-handed system. The X-axis corresponds to a major axis of an aerosol container 150 described later when the aerosol container 150 has the major axis and a minor axis.

Figure 1A:
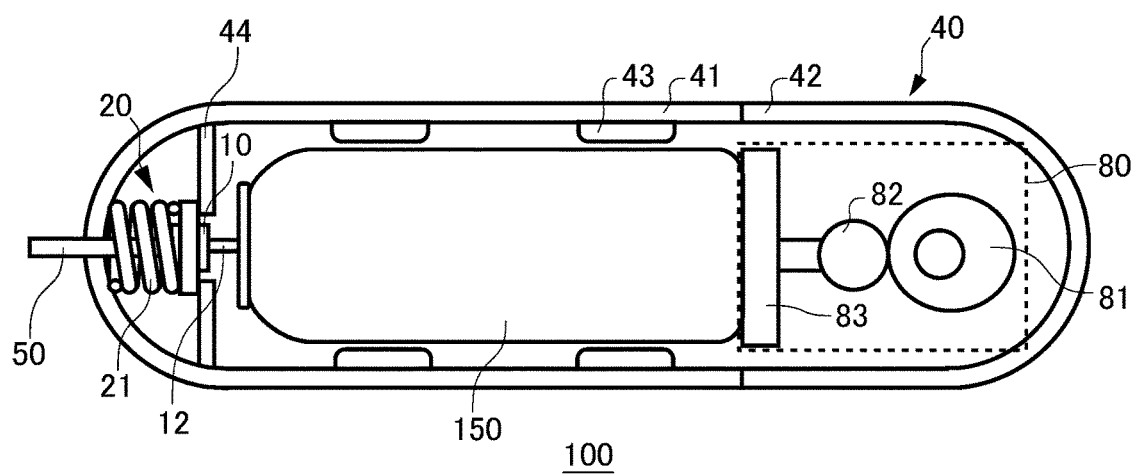
FIG. 1A illustrates one example of a configuration of a discharge apparatus 100.

FIG. 1A illustrates one example of a configuration of a discharge apparatus 100. The discharge apparatus 100 of the present example includes a pressing unit 10, a buffer unit 20, a container retaining unit 40, a discharge unit 50, and a discharge drive unit 80. An aerosol container 150 can be detachably mounted to the discharge apparatus 100.

The aerosol container 150 is configured to discharge contents filled therein by a gas pressure. For example, the aerosol container 150 is configured to eject the contents by a gas pressure of a liquefied gas or a compressed gas filled therein, in response to opening of a valve. The aerosol container 150 of the present example is a metal-made aerosol can. The aerosol container 150 may be a plastic container having a pressure resistance.

Note that, as a propellant, liquefied gas such as hydrocarbon (liquefied petroleum gas) (LPG), dimethyl ether (DME) or fluorohydrocarbon (HFO-1234ze) may be used. In addition, as a propellant, a compressed gas such as carbon dioxide ($CO_2$), nitrogen ($N_2$) or nitrous oxide ($N_2O$) may be used.

The pressing unit 10 is configured to press a stem 12 for opening and closing a valve of the aerosol container 150. The pressing unit 10 may be an actuator for pressing the stem 12. The pressing unit 10 of the present example is provided in direct contact with the stem 12. Note that, the pressing unit 10 may have a flow path corresponding to a discharge direction.

The stem 12 is configured to discharge the contents from the aerosol container 150 by being pressed by the pressing unit 10. Although the stem 12 of the present example is built into the aerosol container 150, the stem may also be externally mounted separately from the aerosol container 150.

The buffer unit 20 is configured to buffer excess force, which is an amount of force by which force with which the pressing unit 10 presses the stem 12 has exceeded force to open the valve. The excess force may be generated by drive force from the discharge drive unit 80. The buffer unit 20 of the present example includes a buffer elastic part 21 connected to the stem 12. The buffer unit 20 of the present example is provided on a stem side of the aerosol container 150, but is not limited thereto. The stem side of the aerosol container 150 refers to a region on a negative side with respect to the aerosol container 150 in the X-axis direction.

The buffer elastic part 21 is an elastic part for buffering the excess force with the buffer unit 20. The buffer elastic part 21 of the present example is a spring having a predetermined natural length L. The buffer elastic part 21 of the present example is a compression spring. Note that, the buffer elastic part 21 may also be a tension spring, depending on a position of the buffer unit 20.

The container retaining unit 40 is configured to retain the aerosol container 150. The container retaining unit 40 may be configured to completely or partially cover the periphery of the aerosol container 150. The container retaining unit 40 has a first accommodation member 41 and a second accommodation member 42. The container retaining unit 40 of the present example has a convex part 43 and a retaining part 44.

A material of the container retaining unit 40 is not particularly limited as long as it can retain the aerosol container 150. For example, the material of the container retaining unit 40 includes a high-strength, light-weight material including metals such as aluminum, plastics, or carbon fibers. The material of the container retaining unit 40 is not limited to hard materials, but may include soft materials such as rubber materials, e.g., silicone rubber or urethane foam.

The first accommodation member 41 is configured to accommodate one end of the aerosol container 150. The first accommodation member 41 of the present example is configured to accommodate the stem side of the aerosol container 150. The first accommodation member 41 of the present example has a conical or dome-shaped curved surface with a rounded tip end, but is not limited thereto.

The second accommodation member 42 is coupled to the first accommodation member 41 and is configured to accommodate the other end of the aerosol container 150. The second accommodation member 42 of the present example is configured to cover an end portion of the aerosol container 150 on a bottom side opposite to the stem side. The second accommodation member 42 may be configured to accommodate the discharge drive unit 80. The second accommodation member 42 of the present example has a conical or dome-shaped curved surface with a rounded tip end, but is not limited thereto. The second accommodation member 42 may be provided to be removable from the first accommodation member 41.

The convex part 43 is provided on an inner side of the container retaining unit 40 and is configured to retain the aerosol container 150 at a predetermined position. The convex part 43 of the present example is configured to retain the aerosol container 150 so as to arrange the aerosol container 150 at a center of the container retaining unit 40 on the YZ plane. The container retaining unit 40 of the present example has a plurality of convex parts 43.

The retaining part 44 is configured to retain the buffer unit 20 at a predetermined position. The retaining part 44 of the present example is provided extending inwardly from an inner wall of the first accommodation member 41. The retaining part 44 is configured to retain the buffer unit 20 at a tip end of the first accommodation member 41.

The discharge drive unit 80 is configured to supply drive force for discharging the contents from the aerosol container 150. The discharge drive unit 80 of the present example is configured to generate the drive force from the bottom side toward the stem side of the aerosol container 150. The discharge drive unit 80 of the present example is accommodated in the second accommodation member 42 located on the bottom side of the aerosol container 150. The second accommodation member 42 is configured to function as a casing for the discharge drive unit 80. The discharge drive unit 80 has a cam 81, a cam follower 82, and a movable part 83. Since the discharge drive unit 80 is provided in the container retaining unit 40, the discharge drive unit 80 does not need to be replaced when replacing the aerosol container 150.

The cam 81 is rotationally driven by a drive source. In one example, a motor is used as the drive source. The cam 81 has a structure having a varying distance from a center of rotation to an outer circumference. Note that, a shape of the cam 81 of the present example is shown in an exaggerated manner. The cam 81 is in contact with the cam follower 82 on the outer circumference.

The cam follower 82 is provided between the cam 81 and the movable part 83. The cam follower 82 is connected to the cam 81 and the movable part 83, and is configured to transmit a rotational movement of the cam 81 to the movable part 83 as a linear movement. The cam follower 82 is configured to linearly move, according to a difference in distance from the center of rotation to the outer circumference of the cam 81.

The movable unit 83 is provided in contact with a bottom surface of the aerosol container 150 and is configured to control opening and closing of the valve of the aerosol container 150. The movable part 83 is configured to move forward and backward in the X-axis direction by the cam follower 82. For example, when a distance between the center of rotation of the cam 81 and a contact area of the cam 81 on which the cam follower 82 abuts is short, the movable part 83 moves backward with respect to the aerosol container 150, and the valve of the aerosol container 150 is accordingly closed. On the other hand, when the distance between the center of rotation of the cam 81 and the contact area of the cam 81 on which the cam follower 82 abuts is long, the movable part 83 moves forward with respect to the aerosol container 150, and the valve of the aerosol container 150 is accordingly opened.

Note that, the discharge drive unit 80 has a configuration in which a rotational movement of the motor is converted into a linear movement by a cam mechanism, but it is not limited to the cam mechanism. For example, the mechanism of the discharge drive unit 80 may be any mechanism that converts the rotational movement of the motor into the linear movement, such as a screw feeding mechanism or a rack and pinion. In addition, as the drive source, a linear motor for linear drive, an air cylinder, an electromagnetic solenoid, or the like may be provided instead of the rotary motor.

The discharge unit 50 is connected to the aerosol container 150 and is configured to discharge the contents in the aerosol container 150. The contents may take any form of liquid, gas, or solid. The contents may be in any state such as powder, granule, or gel. The discharge unit 50 is an exemplary nozzle for discharging the contents. The discharge unit 50 has a discharge port for discharging the contents in the aerosol container 150.

The buffer unit 20 of the present example is configured to buffer the excess force exerted on the pressing unit 10 by moving the pressing unit 10 according to the excess force. For example, when the drive force becomes excess force equal to or greater than a predetermined magnitude, the buffer unit 20 moves the pressing unit 10 to the negative side in the X-axis direction by compression of the buffer elastic part 21, thereby buffering the excess force. In this way, the discharge apparatus 100 of the present example can avoid damage to a component due to the excess force by buffering the generated excess force with the buffer unit 20.

The discharge apparatus 100 of the present example includes the buffer unit 20 on the stem side (i.e., the negative side with respect to the aerosol container 150 in the X-axis direction), and the discharge drive unit 80 on the bottom side (i.e., the positive side with respect to the aerosol container 150 in the X-axis direction). However, the positions of the buffer unit 20 and the discharge drive unit 80 are not limited thereto. Both the buffer unit 20 and the discharge drive unit 80 may be provided on the stem side or on the bottom side. In addition, the discharge drive unit 80 may be provided on the stem side, and the buffer unit 20 may be provided on the bottom side.

Note that, the aerosol container 150 of the present example is directly mounted to the container retaining unit 40. However, the aerosol container 150 may be accommodated in an accommodation member and then mounted to the container retaining unit 40. In this case, since the accommodation member protects the aerosol container 150 from impact, safety in the event of an accident is increased.

Figure 1B:
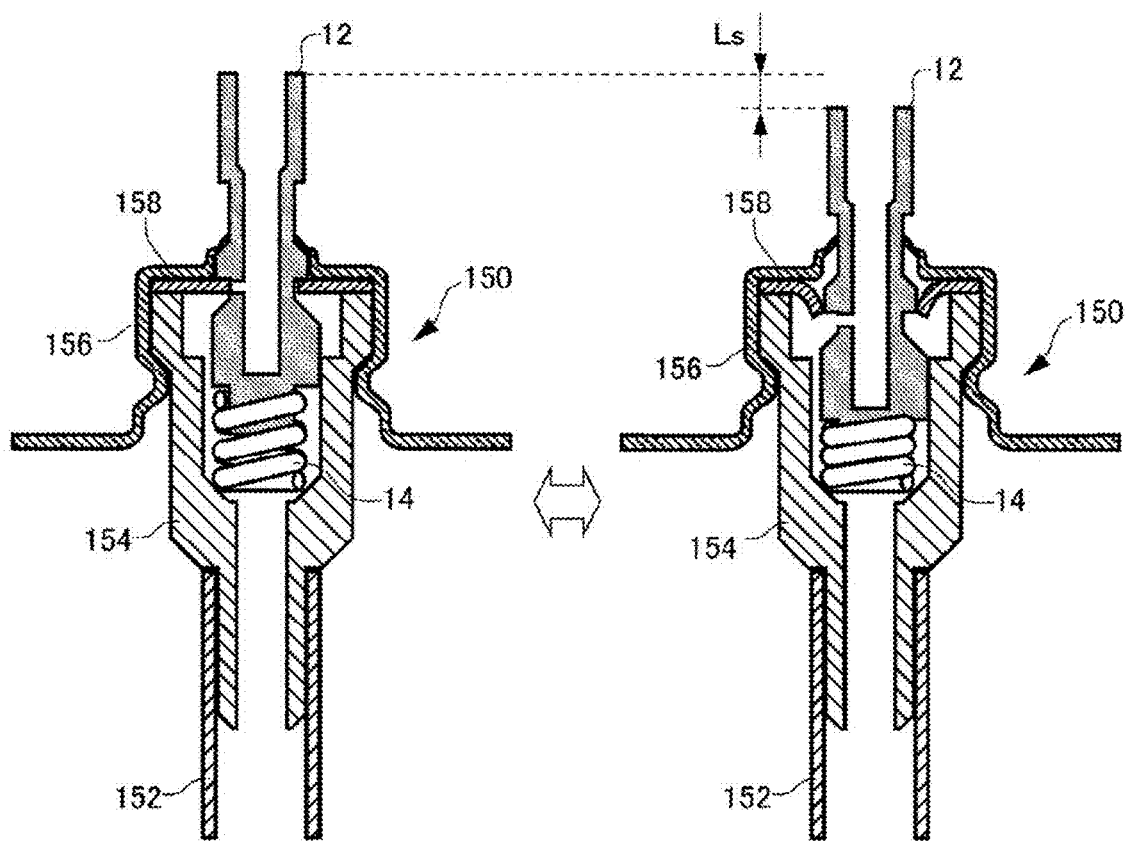
FIG. 1B is an enlarged view of a stem structure of an aerosol container 150.

FIG. 1B is an enlarged view of a stem structure of the aerosol container 150. The aerosol container 150 includes a dip tube 152, a housing 154, a mounting cup 156, and a gasket 158. The aerosol container 150 of the present example includes the stem 12 and a stem elastic part 14. In the present example, states before and after opening and closing the valve of the aerosol container 150 are shown.

The stem 12 has a flow path for discharging contents. The flow path of the stem 12 is connected to the dip tube 152 when the stem 12 is pressed by the pressing unit 10.

The stem elastic part 14 is a spring that extends and contracts according to the motion of the stem 12. The stem elastic part 14 is retained between the stem 12 and the housing 154. When the stem 12 moves to the positive side in the X-axis direction, the stem elastic part 14 is compressed. When the stem 12 moves to the negative side in the X-axis direction, the stem elastic part 14 is extended. An elastic direction of the stem elastic part 14 of the present example is the same as an elastic direction of the buffer elastic part 21. The stem elastic part 14 may start compression before the buffer elastic part 21 starts compression.

The dip tube 152 has a flow path extending to the inside of the aerosol container 150 to receive the contents of the aerosol container 150. A length of the dip tube 152 may be changed according to a type of the contents in the aerosol container 150. The dip tube 152 may extend to the vicinity of the bottom of the aerosol container 150.

The housing 154 is coupled to the dip tube 152. The housing 154 is configured to accommodate the stem 12 and the stem elastic part 14. The housing 154 has a flow path through which the contents flow from the dip tube 152 to the stem 12.

The mounting cup 156 is provided on an upper surface of the aerosol container 150. The mounting cup 156 is configured to fix the stem 12 and housing 154 to a body of the aerosol container 150.

The gasket 158 is configured to deform according to the movement of the stem 12 in the X-axis direction to open and close a passage for the contents. In the present example, when the stem 12 moves toward the bottom side of the aerosol container 150, the passage is opened.

A stem stroke Ls is a distance from a start position of movement of the stem 12 to an end position where the movement of the stem 12 ends as the stem elastic part 14 is compressed. The start position of the movement of the stem 12 refers to a position of the stem 12 in a state where no drive force is applied from the discharge drive unit 80. If the stem 12 moves beyond the stem stroke Ls, there is a concern about damage to an inside structure that the stem elastic part 14 is destroyed and the stem 12 is lodged in the housing 154.

Figure 1C:
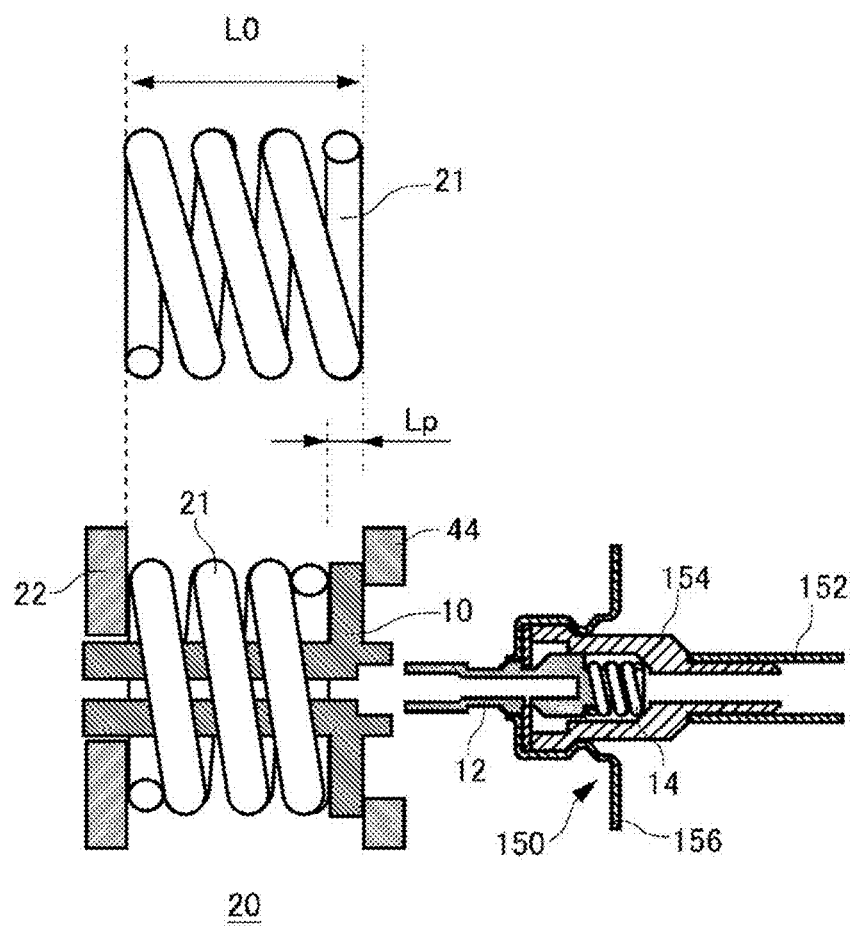
FIG. 1C is an enlarged view of the periphery of a preloaded buffer unit 20.
Figure 1C:
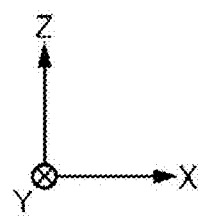

FIG. 1C is an enlarged view of the periphery of the preloaded buffer unit 20. The buffer unit 20 of the present example includes a buffer elastic part 21 preloaded by the retaining part 44.

The buffer unit 20 includes a preload mechanism configured to apply preload to the buffer elastic part 21. The buffer unit 20 can adjust an operation of the buffer elastic part 21 by the drive force by applying preload to the buffer elastic part 21. For example, when the preload is applied, the buffer elastic part 21 becomes less likely to be compressed according to the drive force. The preload may be equal to or greater than the force required to open the valve of the aerosol container 150. Thereby, it is possible to prevent the buffer unit 20 from being operated with force weaker than the force required to open the valve of the aerosol container 150.

The fixing part 22 is configured to fix an end portion on a negative side of the buffer elastic part 21 in the X-axis direction. The fixing part 22 is configured to sandwich the buffer elastic part 21 between the fixing part and the pressing unit 10. For example, when the stem 12 is moved to the negative side in the X-axis direction by the drive force, the fixing part 22 fixes the end portion of the buffer elastic part 21 and compresses the buffer elastic part 21.

The retaining part 44 is configured to retain the pressing unit 10 at a position where the buffer elastic part 21 is in a preloaded state. The preload refers to compressing the spring in advance and applying force thereto. The buffer elastic part 21 is preloaded, so that the buffer elastic part 21 does not deform until a predetermined load is applied. The retaining part 44 of the present example is one example of the preload mechanism.

A preload length Lp indicates a pre-compressed length of the buffer elastic part 21. The buffer elastic part 21 is retained compressed by the preload length Lp from the natural length L in a state where it is not pressed.

For example, if force of 2 kgf is required to push the stem 12, preload of 3 kgf is applied. For example, when the buffer elastic part 21 has a spring structure as shown in FIG. 1C, a magnitude of the preload is calculated as 'a spring constant of the buffer elastic part 21×the preload length Lp'.

The preload length Lp of the preload mechanism may be adjusted according to a state of the buffer elastic part 21. In one example, the preload length Lp of the preload mechanism is adjusted according to temporal deterioration of the buffer elastic part 21. The preload length Lp of the preload mechanism may be increased as the deterioration of the buffer elastic part 21 increases. Note that, although the buffer elastic part 21 of the present example is preloaded, it may not be preloaded.

Figure 1D:
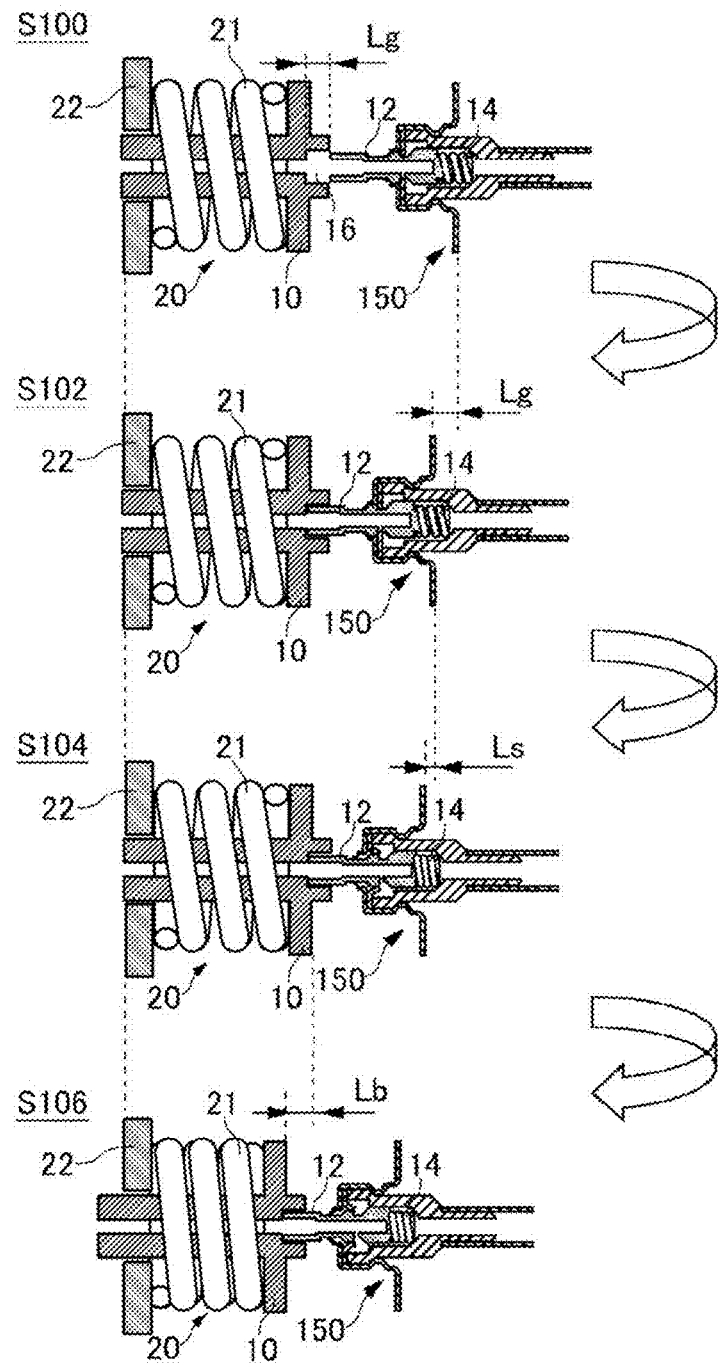
FIG. 1D is a view for illustrating an operation of the discharge apparatus 100.

FIG. 1D is a view for illustrating an operation of the discharge apparatus 100. In the present example, each step in which the aerosol container 150 is gradually moved by the driving of the discharge drive unit 80 is shown.

In step S100, the buffer unit 20 is preloaded. The discharge apparatus 100 has a gap 16 between the stem 12 and the pressing unit 10 in a state in which the valve of the aerosol container 150 is closed. By providing the gap 16, even when there is a manufacturing variation of the discharge apparatus 100 or the aerosol container 150, the stem 12 can be prevented from being pressed unintentionally.

In step S102, the aerosol container 150 moves towards the pressing unit 10, and therefore, the pressing unit 10 and the stem 12 are in contact with each other. The stem 12 moves a distance corresponding to an interval Lg of the gap 16 after the stem 12 moves to open the valve of the aerosol container 150 until the stem comes into contact with the pressing unit 10. The interval Lg is a width of the gap 16 in the X-axis direction.

In step S104, the aerosol container 150 is further moved toward the pressing unit 10, and the stem elastic part 14 is thus compressed. Between step S102 and step S104, the aerosol container 150 has moved a distance corresponding to the stem stroke Ls of the stem 12.

In step S106, the buffer elastic part 21 is compressed to buffer the excess force. A buffer length Lb is a length by which the buffer unit 20 is compressed so as to buffer the excess force. That is, the buffer length Lb is a distance overtraveled by the excess force. In this way, even when the buffer unit 20 has overtraveled, the buffer elastic part 21 buffers the excess force, so that damage to a component can be avoided.

Here, the excess force is force enabling overtravel beyond the interval Lg of the gap 16 and the stem stroke Ls by the stem elastic part 14. Since the buffer unit 20 of the present example includes the buffer elastic part 21, the buffer unit can be used repeatedly without being destroyed even when the excess force is generated.

Figure 1E:
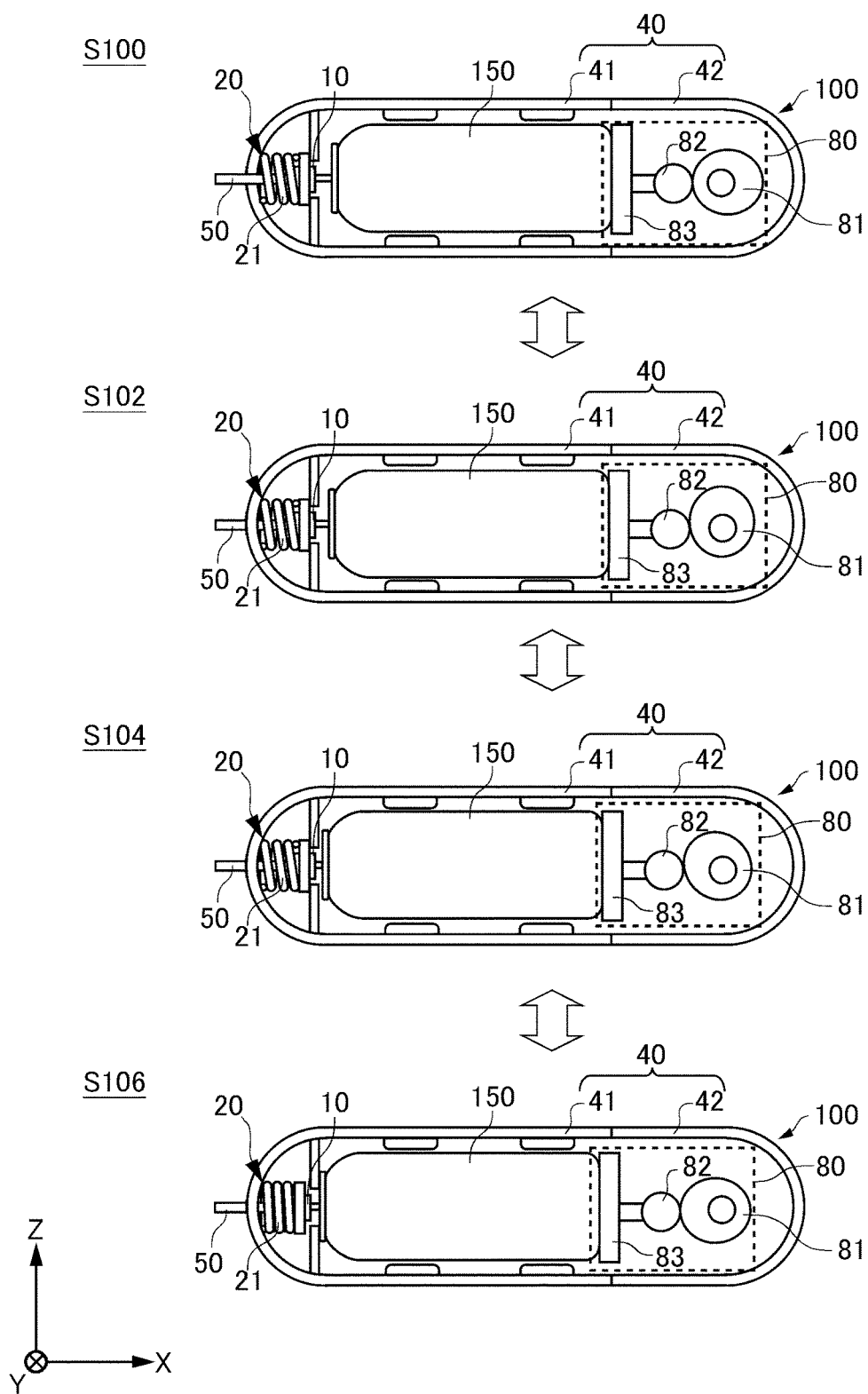
FIG. 1E illustrates an operation of a discharge drive unit 80 corresponding to each step in FIG. 1D.

Note that, a cam stroke Lc of the discharge drive unit 80 is a distance from a position on the most positive side of the movable unit 83 in the X-axis direction to a position on the most negative side of the movable unit 83 in the X-axis direction. That is, the cam stroke Lc is the maximum moving distance of the movable part 83. The cam stroke Lc of the present example is expressed by a following equation.
Lc=Lg+Ls+Lb FIG. 1E illustrates an operation of the discharge drive unit 80 corresponding to each step in FIG. 1D. Steps S100 to S106 of the present example correspond to steps S100 to S106 in FIG. 1D, respectively.

In step S100, the discharge drive unit 80 does not drive the aerosol container 150, and is located in a state of being most pulled to the bottom side of the aerosol container 150. In step S102, the cam 81 is driven, so that the cam follower 82 gradually moves the movable part 83 toward the stem side of the aerosol container 150. In step S104, the aerosol container 150 is further moved toward the stem side of the aerosol container 150. In step S106, the cam 81 has come to a position where the cam most moves the movable part 83 toward the stem side of the aerosol container 150. That is, the discharge drive unit 80 does not move the aerosol container 150 to the negative side in the X-axis direction beyond the position shown in step S106.

Here, the manufacturing variation may occur in the discharge apparatus 100 or the aerosol container 150. For example, the length of the aerosol container 150 or the length of the stem 12 is not constant, so that a variation may occur in a length from the bottom of the aerosol container 150 to the tip end of the stem 12. That is, the interval Lg of the gap 16 between the stem 12 and the pressing unit 10 varies.

On the other hand, the cam stroke Lc of the discharge drive unit 80 is constant regardless of the variation in length of the aerosol container 150. Therefore, when the aerosol container 150 is long, a press-in amount becomes large, and when the aerosol container 150 is short, a discharge failure may occur. The buffer unit 20 of the present example buffers the excess force with the appropriate buffer length Lb according to the manufacturing variation.

For this reason, the discharge apparatus 100 can avoid damage to a component even when the manufacturing variation occurs. Note that, the discharge apparatus 100 can avoid an influence due to deformation not only when the manufacturing variation occurs but also when the aerosol container 150 is deformed due to temperatures.

Figure 2:
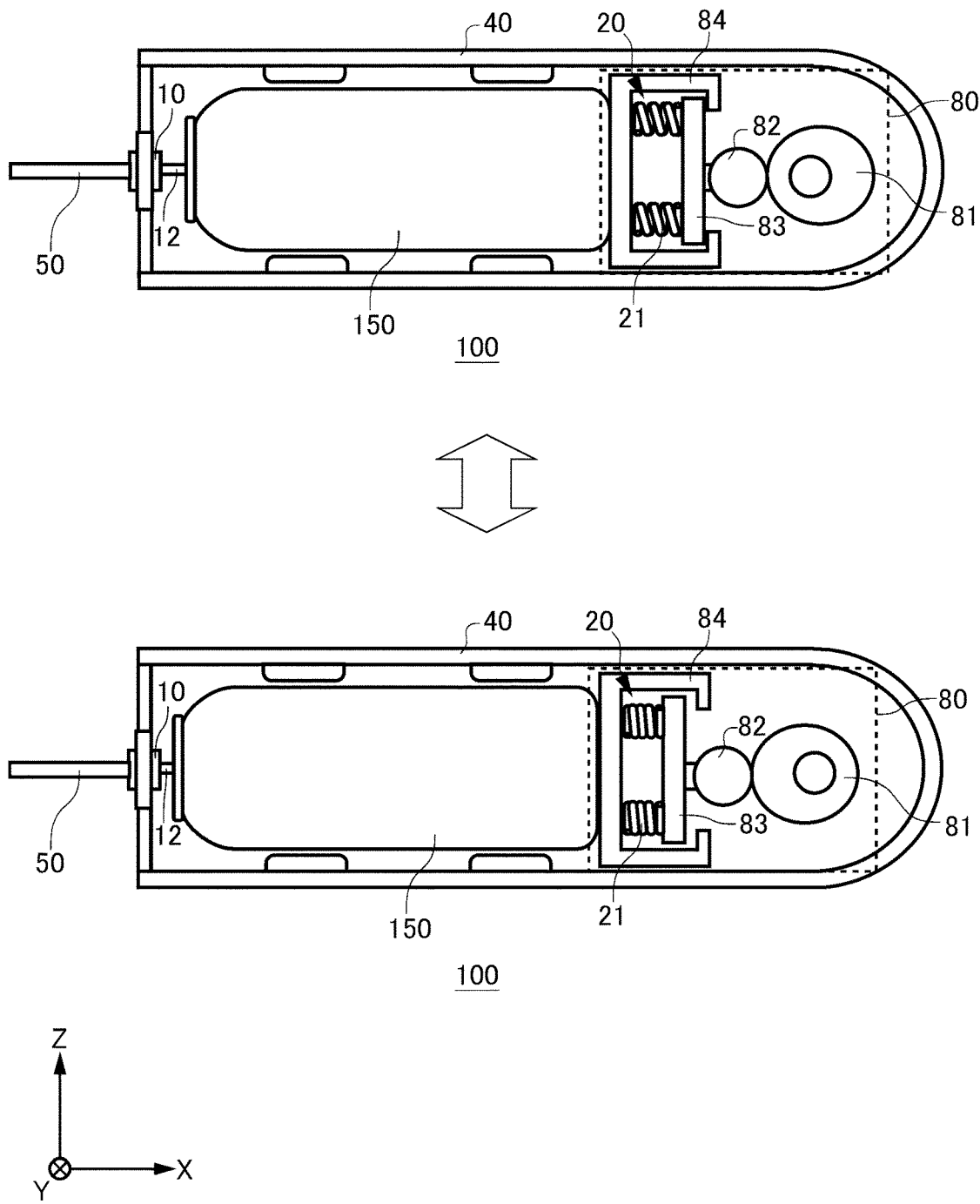
FIG. 2 illustrates one example of the configuration of the discharge apparatus 100.

FIG. 2 illustrates one example of the configuration of the discharge apparatus 100. The discharge apparatus 100 of the present example includes the buffer unit 20 in the discharge drive unit 80.

The buffer unit 20 is provided in the discharge drive unit 80 and is configured to buffer the excess force inside the discharge drive unit 80. The buffer unit 20 of the present example is provided between the movable part 83 and the aerosol container 150. The buffer unit 20 may include a plurality of buffer elastic parts 21. When the excess force that is transmitted from the movable part 83 to the aerosol container 150 is generated, the buffer unit 20 compresses the buffer elastic part 21 to buffer the excess force. Thereby, transmission of the excess force to the aerosol container 150 can be suppressed.

A support part 84 is provided between the aerosol container 150 and the buffer unit 20. The support part 84 is configured to support the bottom surface of the aerosol container 150 and to transmit the drive force of the discharge drive unit 80 to the aerosol container 150. However, since the excess force is buffered by the buffer unit 20, the support part 84 does not transmit the excess force to the aerosol container 150. Although the support part 84 of the present example has a structure where the buffer unit 20 is accommodated inside, the present invention is not limited thereto.

Figure 3:
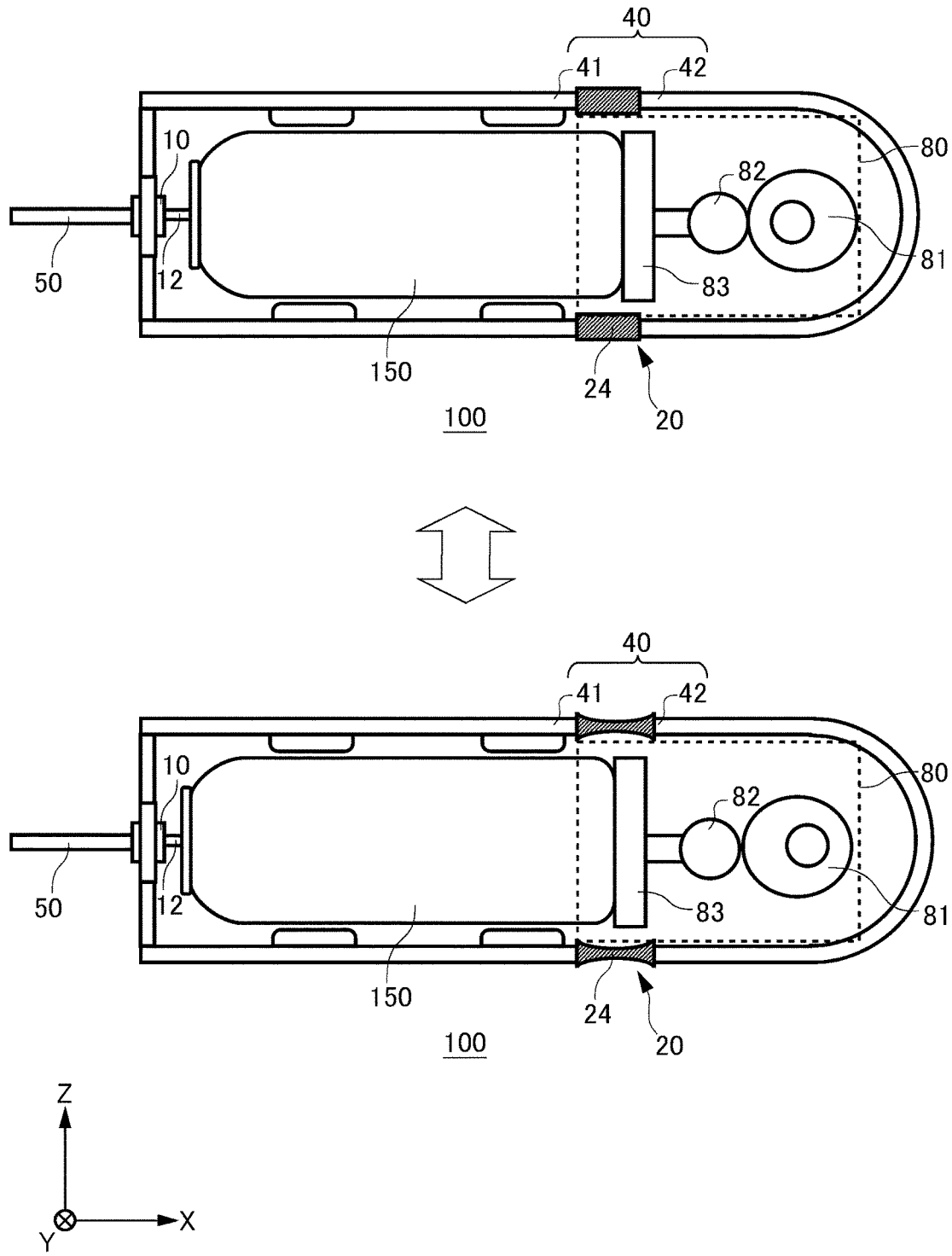
FIG. 3 illustrates one example of the configuration of the discharge apparatus 100.

FIG. 3 illustrates one example of the configuration of the discharge apparatus 100. The buffer unit 20 of the present example has a buffer structure 24 provided to the container retaining unit 40.

The buffer unit 20 is configured to couple the first accommodation member 41 and the first accommodation member 41. The buffer unit 20 of the present example is configured to buffer the excess force by varying relative positions of the first accommodation member 41 and the second accommodation member 42 according to the excess force. The buffer unit 20 of the present example is configured to space the relative positions of the first accommodation member 41 and the second accommodation member 42 by being extended according to the excess force. Thereby, the pressing unit 10 is kept away from the stem 12, and the excess force can be thus buffered. In this way, the excess force can be buffered by the extension of the buffer unit 20, depending on the position where the buffer unit 20 is provided.

The buffer structure 24 is integrally provided with the container retaining unit 40. The buffer structure 24 of the present example has an elastic body such as rubber. The buffer structure 24 may have a property of compressing itself after being extended. The buffer structure 24 may be configured to buffer the excess force by a bellows structure that can be freely extended and contracted. The buffer structure 24 is provided along the outer circumference of the container retaining unit 40.

Figure 4A:
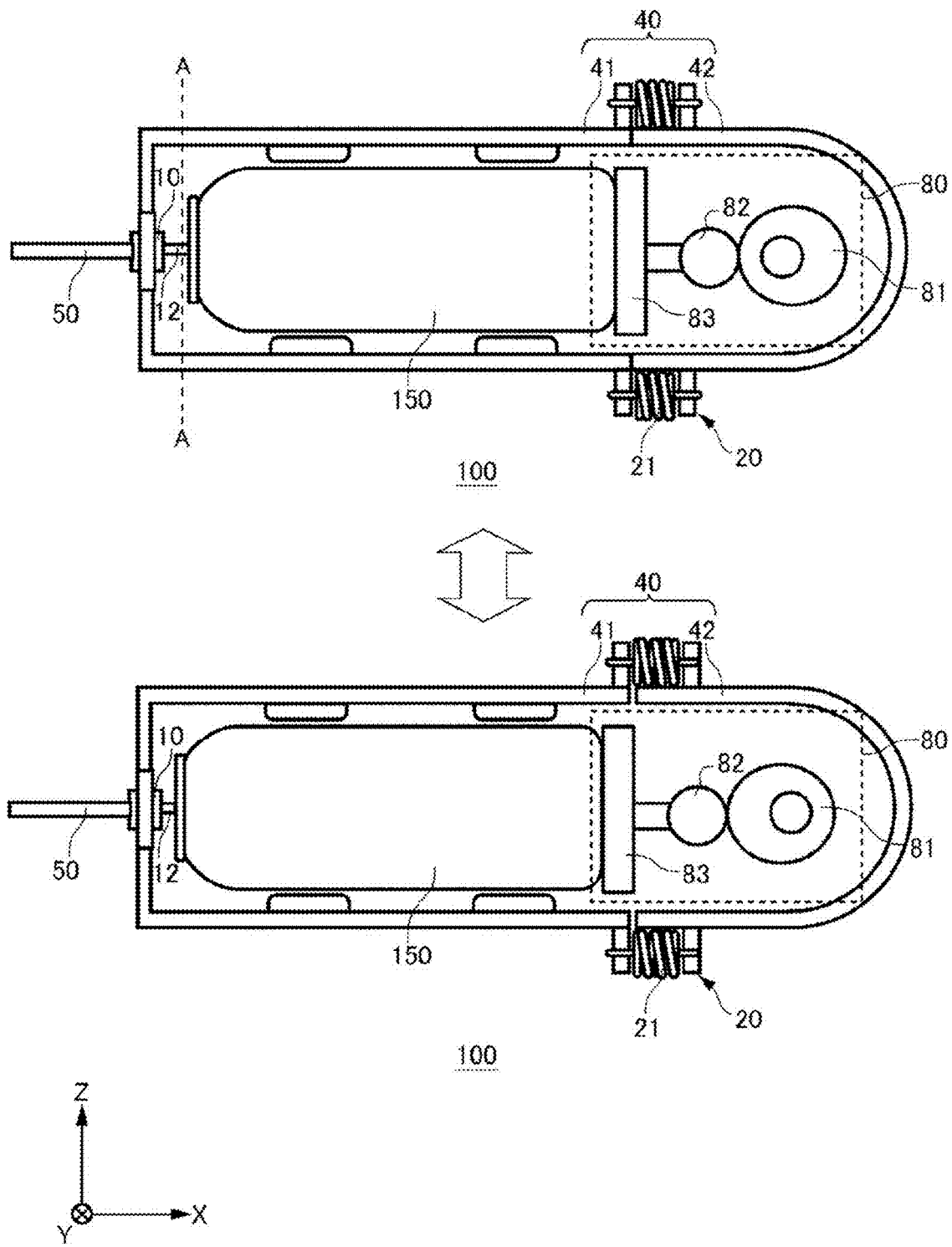
FIG. 4A illustrates one example of the configuration of the discharge apparatus 100.

FIG. 4A illustrates one example of the configuration of the discharge apparatus 100. The discharge apparatus 100 of the present example includes the buffer unit 20 outside the container retaining unit 40. The buffer unit 20 of the present example includes the buffer elastic part 21 configured to couple the first accommodation member 41 and the second accommodation member 42 each other. The buffer elastic part 21 is a tension spring that is extended by the excess force. By using the tension spring as the buffer elastic part 21, the buffer unit 20 can be provided without increasing the overall length of the discharge apparatus 100. Note that, the discharge drive unit 80 of the present example is provided on the bottom side of the aerosol container 150, but may also be provided on the stem side of the aerosol container 150.

Figure 4B:
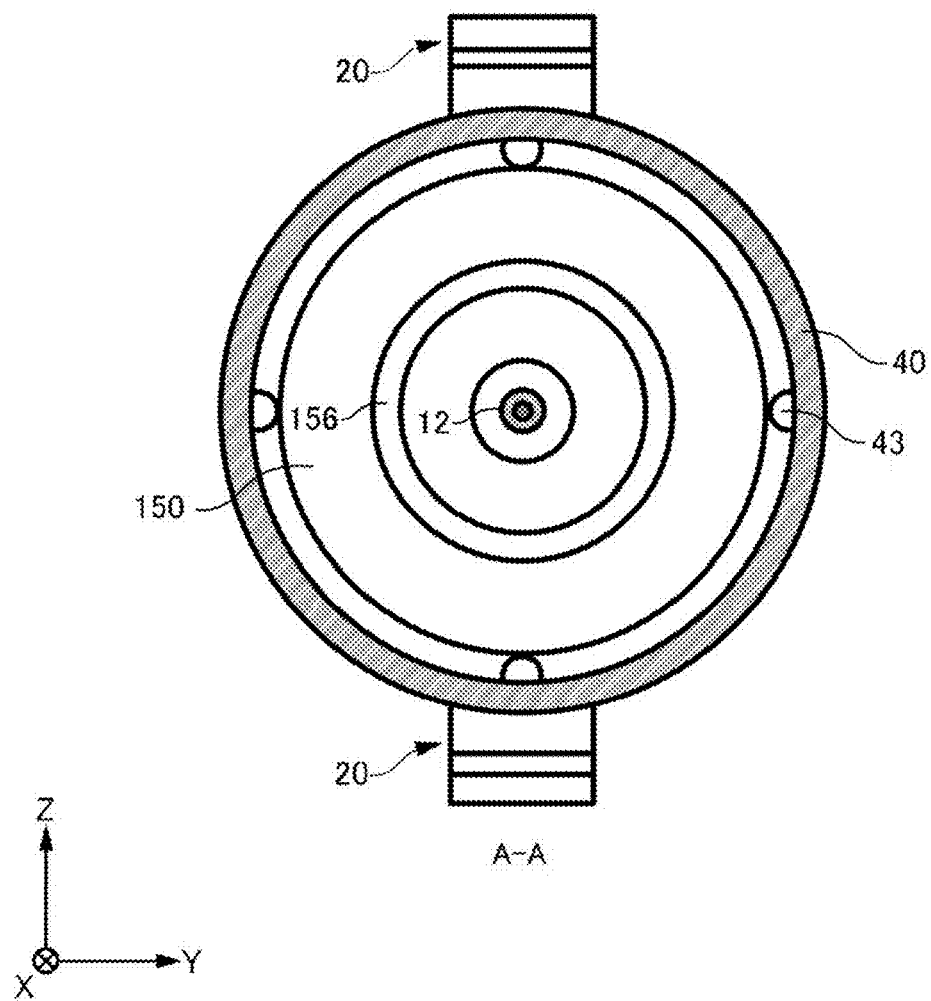
FIG. 4B illustrates a YZ cross-sectional view of the discharge apparatus 100 taken along A-A in FIG. 4A.

FIG. 4B is a YZ cross-sectional view of the discharge apparatus 100 taken along A-A in FIG. 4A. The discharge apparatus 100 of the present example includes a plurality of buffer units 20 above and below the container retaining unit 40.

The buffer unit 20 is provided on an outside of the outer circumference of the aerosol container 150 in a side view along the major axis of the aerosol container 150. This eliminates the need to provide the buffer units 20 in front of and behind the aerosol container 150, thereby making it possible to shorten the length of the discharge apparatus 100 in the X-axis direction. The side view along the major axis of the aerosol container 150 is a YZ cross-sectional view seen from the top surface or bottom surface of the aerosol container.

The plurality of buffer units 20 are each configured to couple the first accommodation member 41 and the second accommodation member 42 each other. The plurality of buffer units 20 may be provided symmetrically with respect to the aerosol container 150. The plurality of buffer units 20 may be arranged at equal intervals on the outer circumference of the container retaining unit 40. Thereby, the plurality of buffer units 20 can relatively move the first accommodation member 41 and the second accommodation member 42 in a well-balanced manner when buffering the excess force. The discharge apparatus 100 of the present example includes the buffer units 20 on the positive side and the negative side in the Z-axis direction, respectively.

Figure 4C:
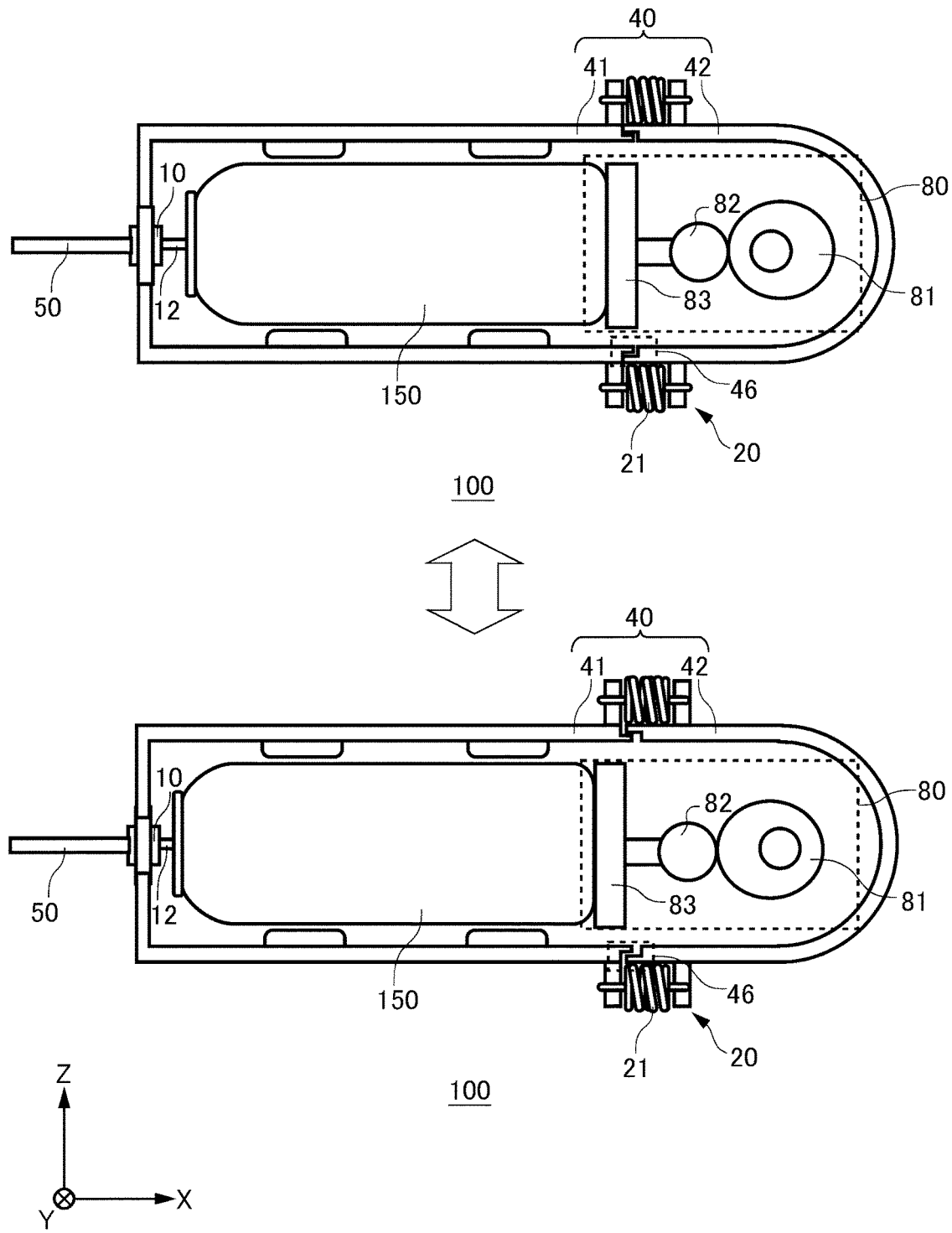
FIG. 4C illustrates one example of the configuration of the discharge apparatus 100.

FIG. 4C illustrates one example of the configuration of the discharge apparatus 100. The discharge apparatus 100 of the present example is different from the embodiment of FIG. 4A, in that it includes an exposure prevention part 46. The first accommodation member 41 and the second accommodation member 42 of the present example are configured as separate members and are separable from each other.

The exposure prevention part 46 is configured to prevent exposure of the inside of the container retaining unit 40 from between the first accommodation member 41 and the second accommodation member 42. The exposure prevention part 46 may be a part where the first accommodation member 41 and the second accommodation member 42 are provided overlapped. The exposure prevention part 46 is configured to prevent exposure of the inside of the container retaining unit 40 even when the buffer unit 20 is in an extended state so as to buffer the excess force. This makes it possible to prevent contamination of the inside by rainwater or the like. In addition, the exposure prevention part 46 may be configured to function as a guide mechanism for moving the first accommodation member 41 and the second accommodation member 42 in the X-axis direction.

Figure 4D:
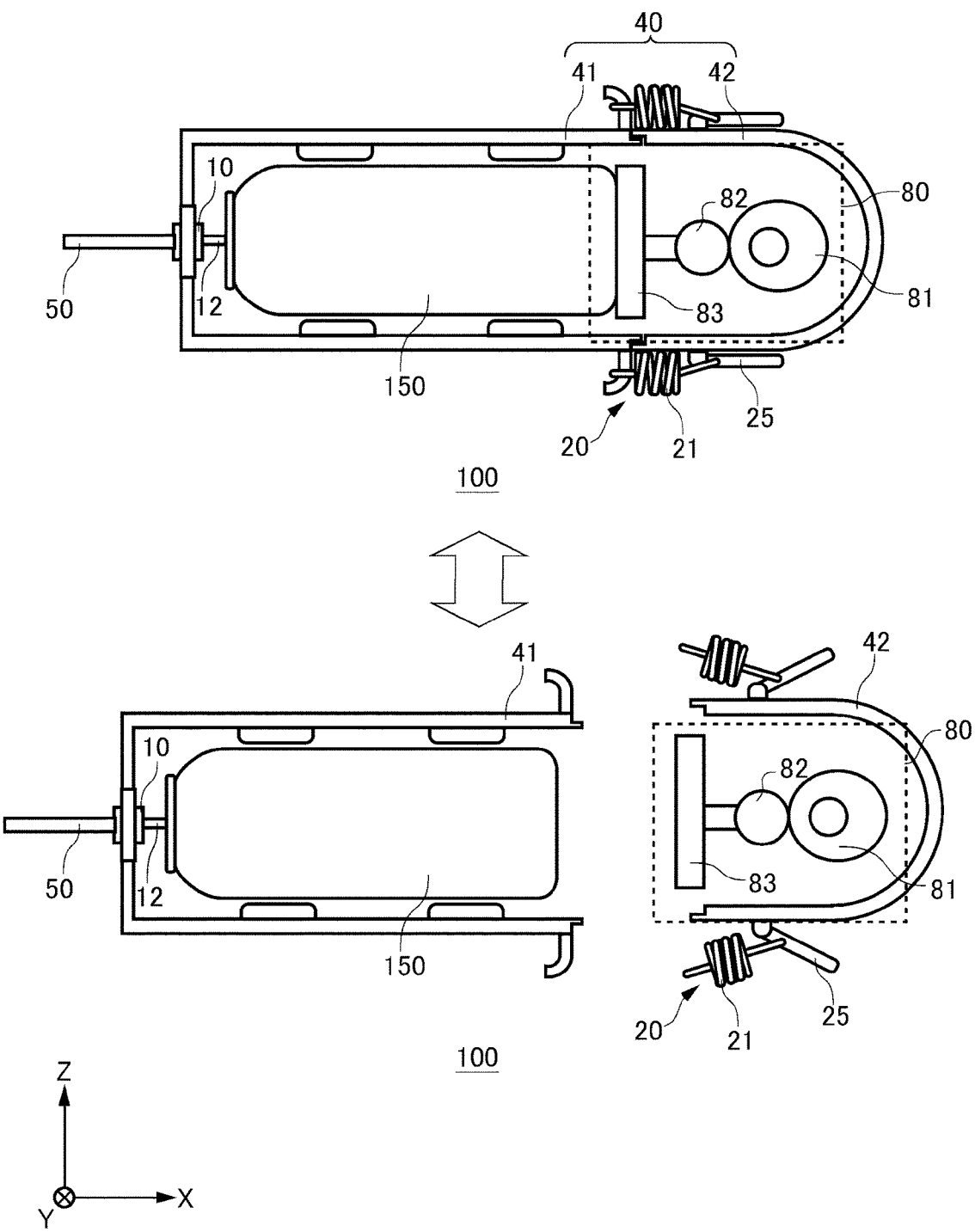
FIG. 4D illustrates one example of the configuration of the discharge apparatus 100.

FIG. 4D illustrates one example of the configuration of the discharge apparatus 100. The discharge apparatus 100 of the present example includes a snap lock 25. The snap lock 25 is one example of the buffer unit 20. The first accommodation member 41 and the second accommodation member 42 of the present example are configured as separate members and are separable from each other.

The snap lock 25 is a snap lock with an elastic part attached to the container retaining unit 40. The discharge apparatus 100 can separate the first accommodation member 41 and the second accommodation member 42 by opening the snap lock 25.

The pressing unit 10 and the discharge drive unit 80 are coupled to the accommodation members different from each other. For example, the pressing unit 10 is coupled to the first accommodation member 41 and the discharge drive unit 80 is coupled to the second accommodation member 42. The pressing unit 10 and the discharge drive unit 80 are coupled to the accommodation members different from each other, so that the buffering of the excess force by the buffer unit 20 can be realized.

Figure 5A:
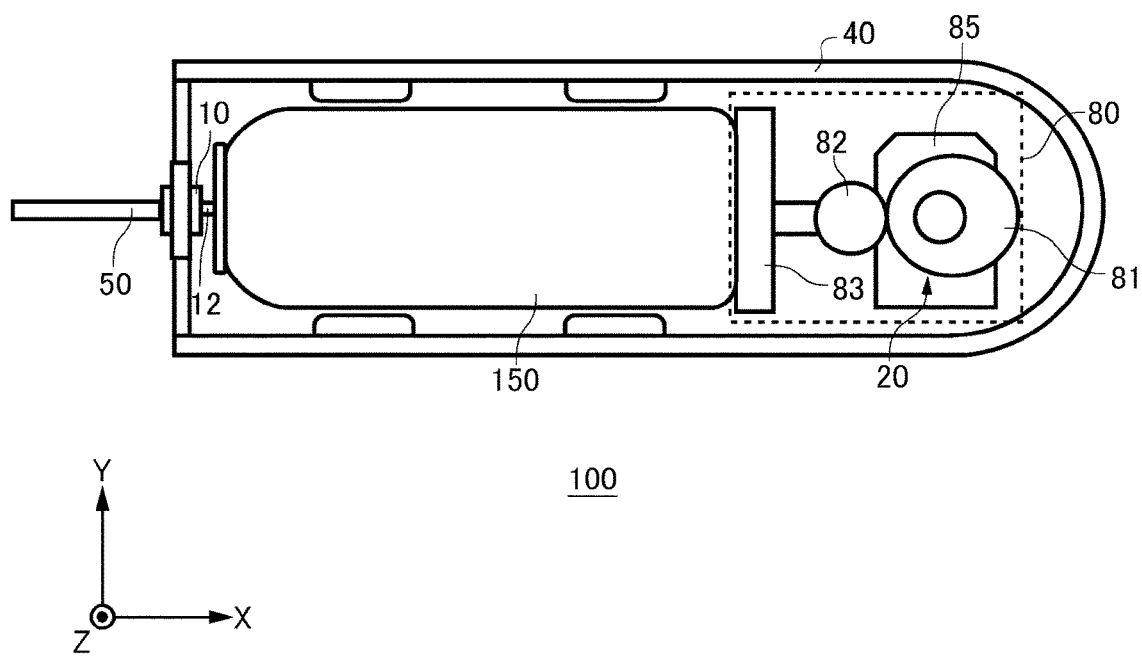
FIG. 5A illustrates one example of the configuration of the discharge apparatus 100.
Figure 5B:
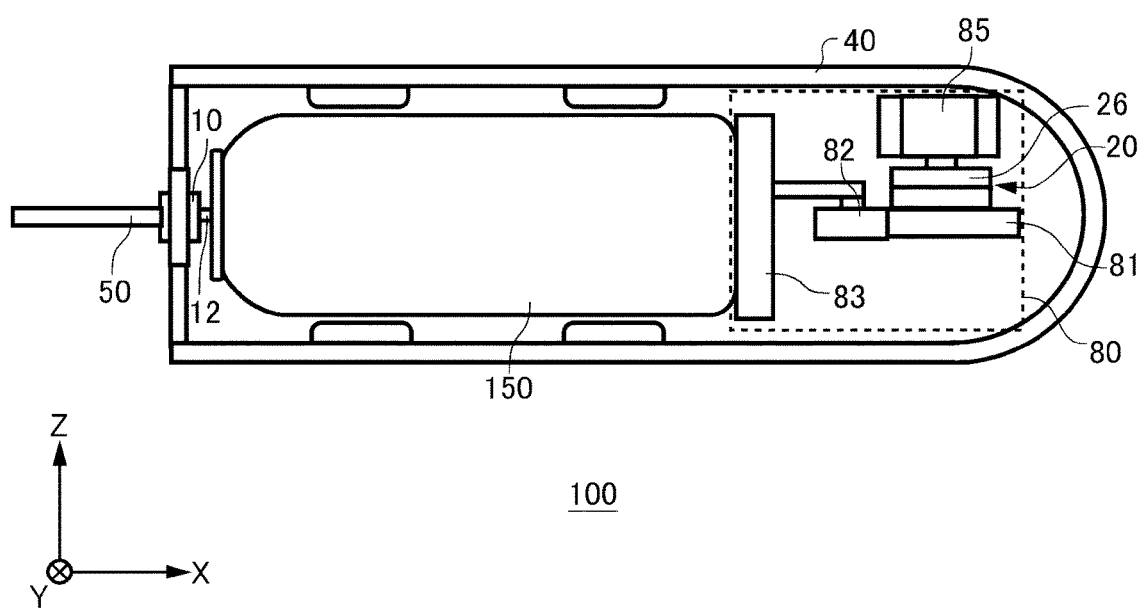
FIG. 5B illustrates a cross-sectional view different from the discharge apparatus 100 in FIG. 5A.

FIG. 5A illustrates one example of the configuration of the discharge apparatus 100. FIG. 5B illustrates a cross-sectional view different from the discharge apparatus 100 in FIG. 5A. FIG. 5A illustrates an XY cross-sectional view of the discharge apparatus 100. FIG. 5B illustrates an XZ cross-sectional view of the discharge apparatus 100. The discharge apparatus 100 of the present example includes a suppression mechanism 26. The suppression mechanism 26 is one example of the buffer unit 20.

The suppression mechanism 26 is provided in the discharge drive unit 80 and is configured to suppress generation of the excess force in the discharge drive unit 80. The suppression mechanism 26 of the present example has a structure that suppresses transmission of force from the motor 85 to the cam 81 when the excess force is generated. For example, the suppression mechanism 26 is a torque limiter that does not transmit torque equal to or greater than a predetermined load. The suppression mechanism 26 is not limited thereto as long as it suppresses transmission of the excess force. The discharge apparatus 100 of the present example can avoid damage to a component due to the excess force by providing the suppression mechanism 26.

Figure 5C:
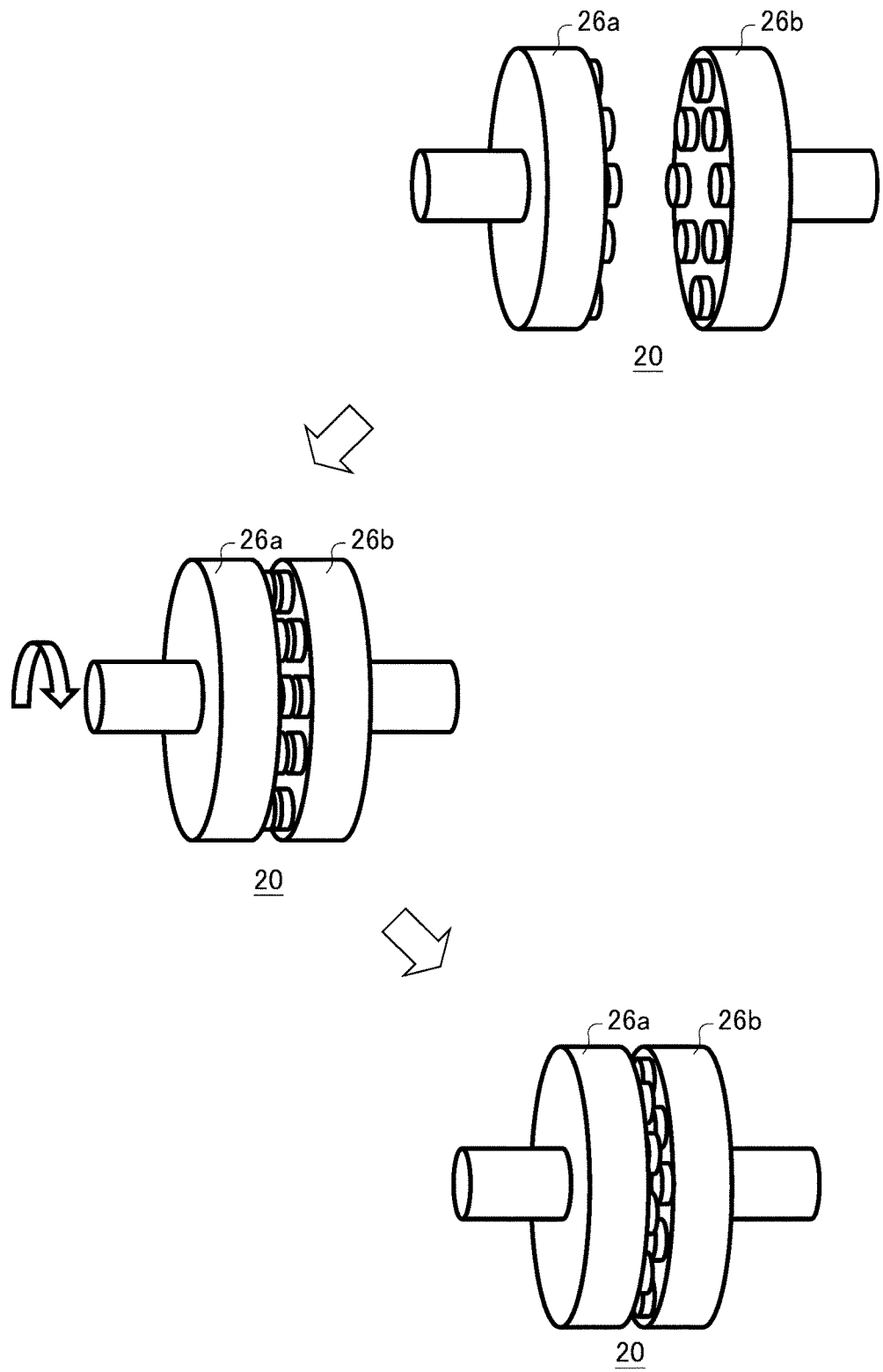
FIG. 5C illustrates one example of a structure of a suppression mechanism 26.

FIG. 5C illustrates one example of the structure of the suppression mechanism 26. The suppression mechanism 26 of the present example is a torque limiter. The suppression mechanism 26 includes a suppression mechanism 26a and a suppression mechanism 26b.

The suppression mechanism 26a and the suppression mechanism 26b each have a magnet face provided with a magnet. The magnet faces of the suppression mechanism 26a and the suppression mechanism 26b face each other, are fixed by magnetic force, and transmit the drive force from the motor 85. When torque exceeding a predetermined magnitude is generated, the suppression mechanism 26 cannot be fixed by the magnetic force, and therefore, runs idle. Thereby, the suppression mechanism 26 can suppress transmission of the excess force.

Figure 6A:
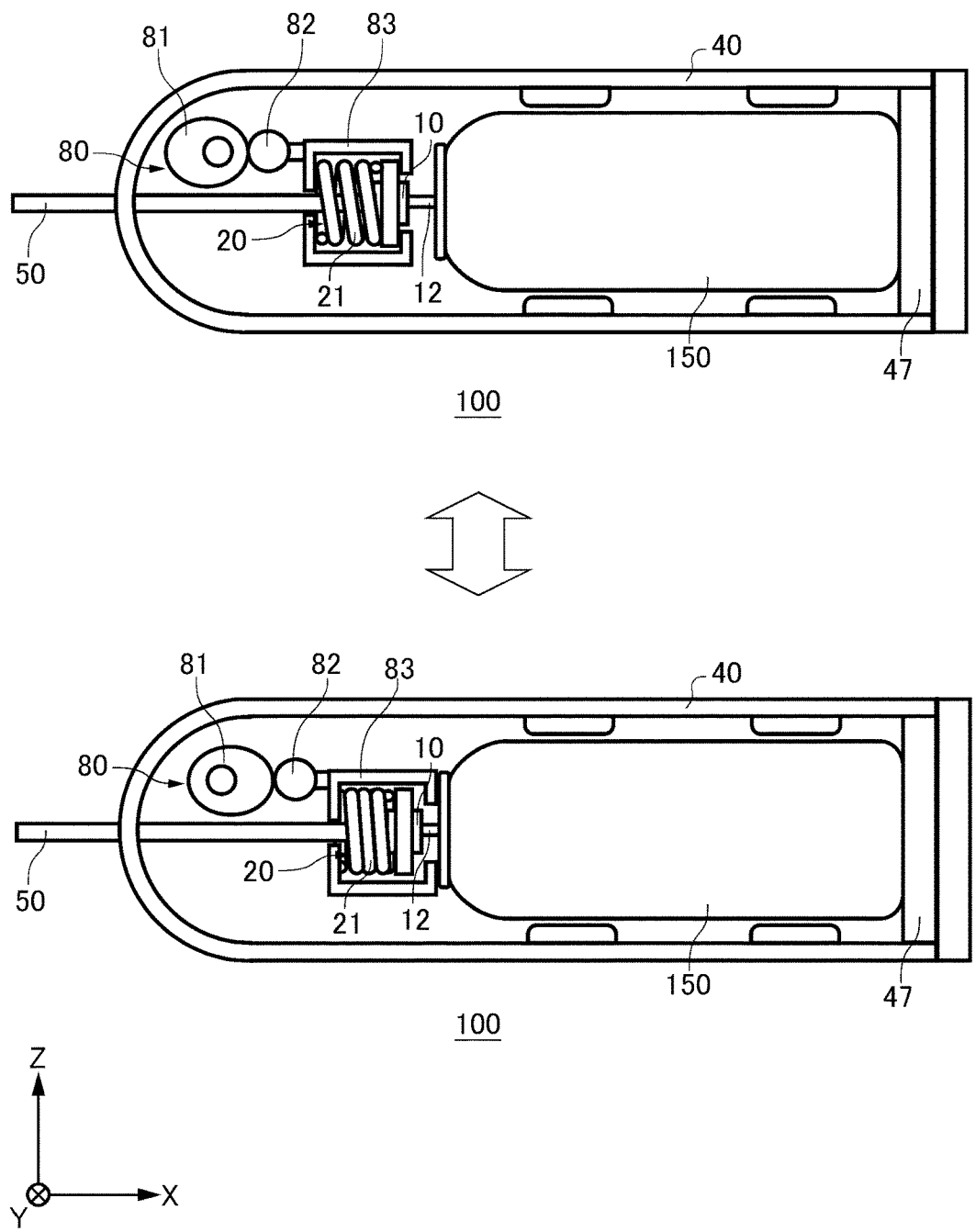
FIG. 6A illustrates one example of the discharge apparatus 100 including a discharge drive unit 80 on a stem side.
Figure 6B:
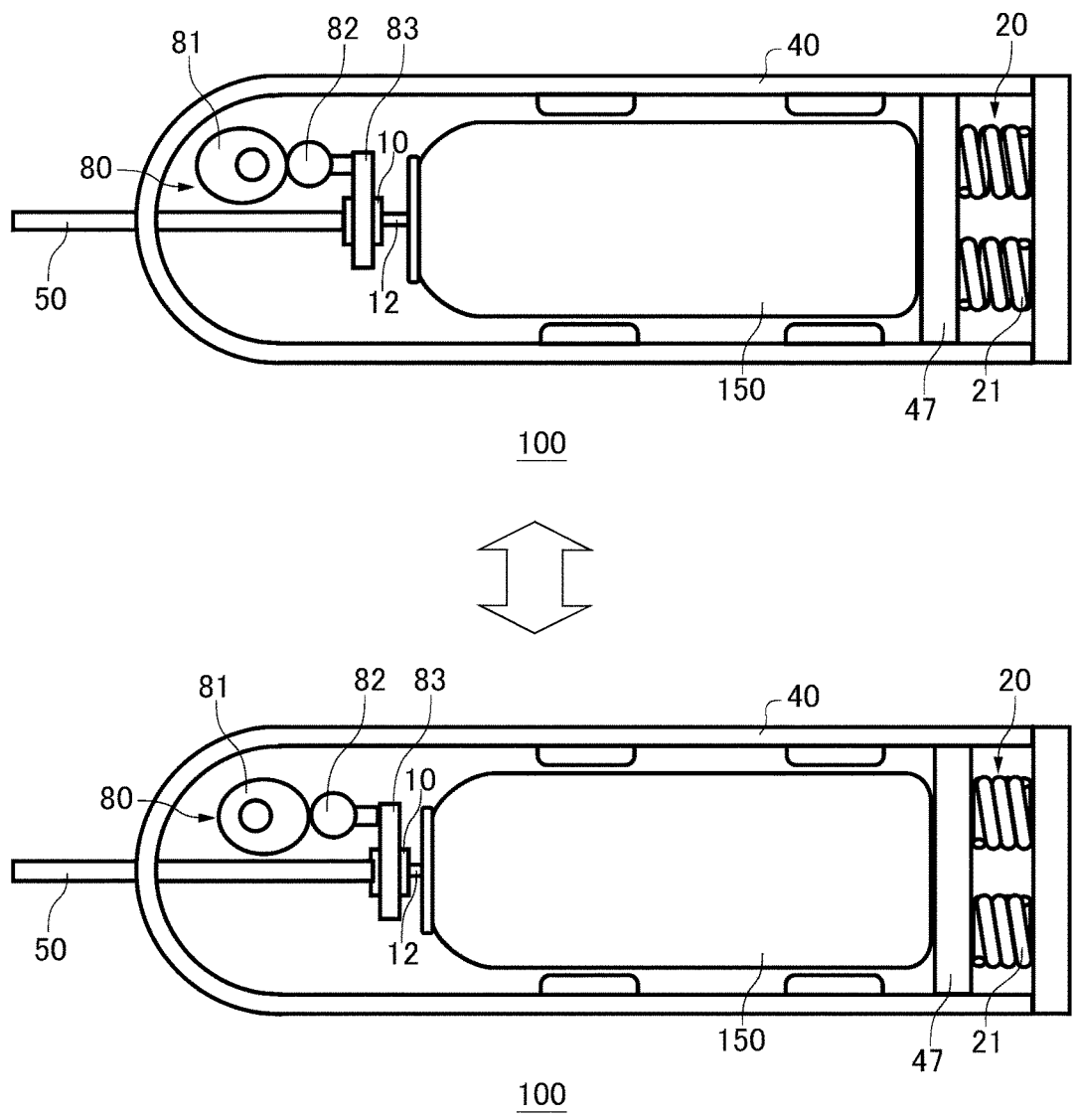
FIG. 6B illustrates a modified embodiment of the discharge apparatus 100 including the discharge drive unit 80 on the stem side.
Figure 6B:
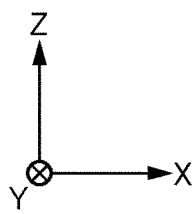
Figure 7A:
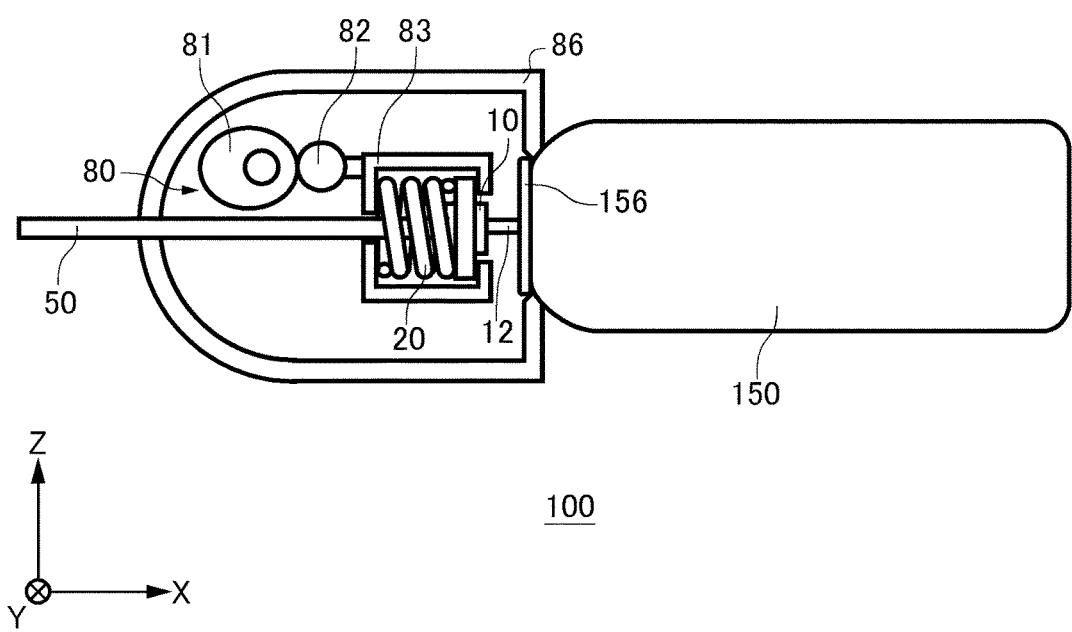
FIG. 7A illustrates one example of the configuration of the discharge apparatus 100 including a drive mechanism accommodation unit 86.
Figure 7B:
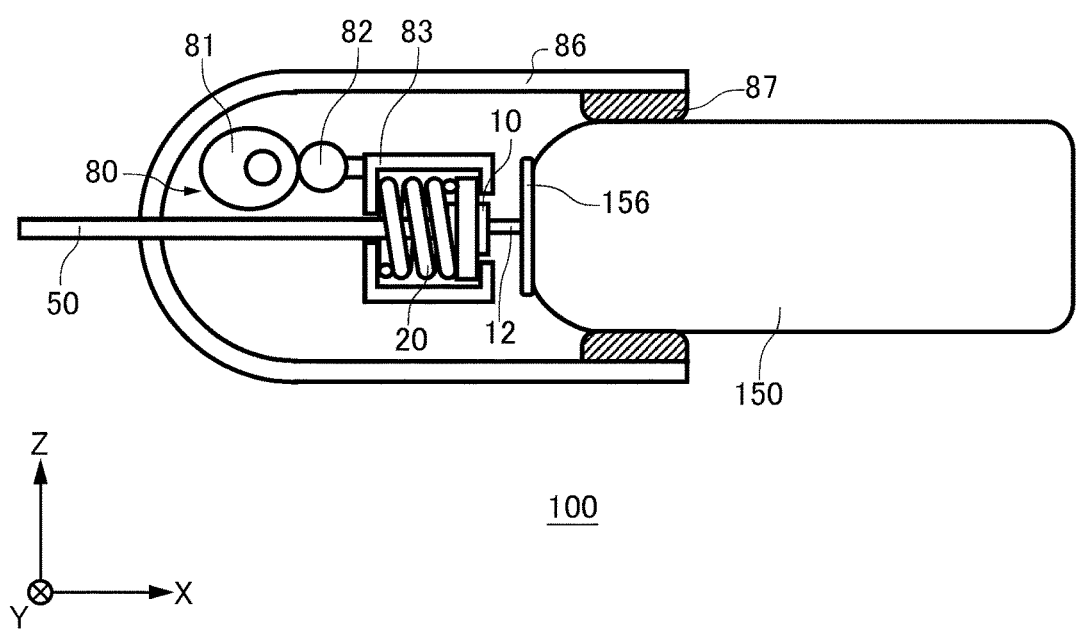
FIG. 7B illustrates a modified embodiment of the discharge apparatus 100 including the drive mechanism accommodation unit 86.
Figure 8:
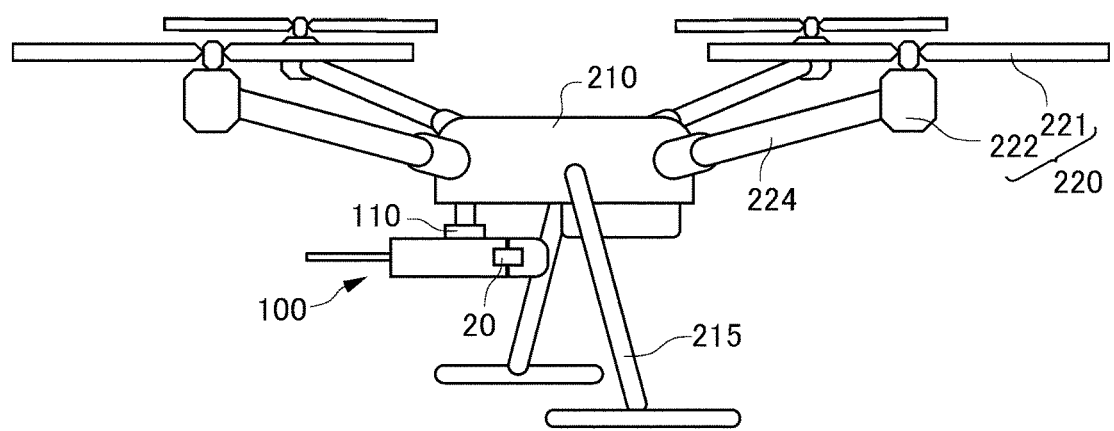
FIG. 8 illustrates one example of a configuration of an unmanned aircraft 200 to which the discharge apparatus 100 is mounted.

FIG. 6A illustrates one example of the discharge apparatus 100 including the discharge drive unit 80 on the stem side. The discharge apparatus 100 of the present example also includes the buffer unit 20 on the stem side. The discharge drive unit 80 is configured to generate the drive force from the stem side toward the bottom side of the aerosol container 150.

The movable part 83 is in contact with the buffer unit 20. The movable part 83 is driven to the positive side in the X-axis direction and presses the stem 12 by the pressing unit 10. The buffer unit 20 of the present example is provided between the movable part 83 and the pressing unit 10, and is configured to transmit the drive force of the discharge drive unit 80 to the pressing unit 10, but is configured to buffer the excess force. Since the buffer unit 20 and the discharge drive unit 80 of the present example are accommodated in the container retaining unit 40 on the stem side of the aerosol container 150, the excess force can be buffered without moving the position of the aerosol container 150 relative to the container retaining unit 40. For this reason, even when the container retaining unit 40 is mounted to an unmanned aircraft or the like, since a position of the center of gravity of the aerosol container 150 relative to the container retaining unit 40 does not vary, the flying of the unmanned aircraft is stable.

Figure 9:
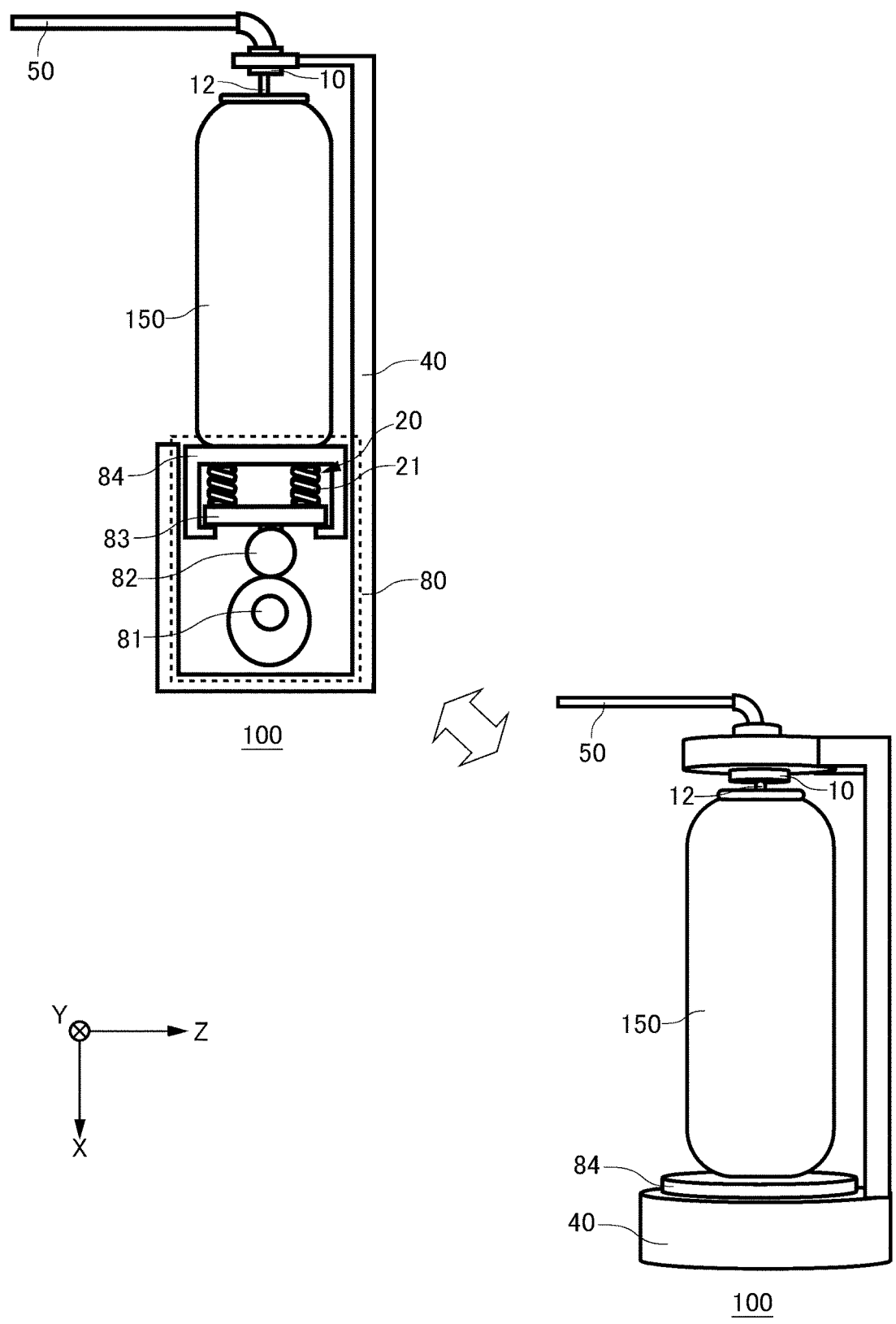
FIG. 9 illustrates a modified embodiment of the discharge apparatus 100.

A support part 47 is configured to support the bottom surface of the aerosol container 150 so that the aerosol container 150 does not move by the drive force of the discharge drive unit 80. The support part 47 of the present example is fixed to the container retaining unit 40.

FIG. 6B illustrates a modified embodiment of the discharge apparatus 100 including the discharge drive unit 80 on the stem side. The discharge apparatus 100 of the present example is different from the embodiment of FIG. 6A, in that the buffer unit 20 is provided on the bottom side of the aerosol container 150. In the present example, the different points from the embodiment in FIG. 6A are described in particular. The discharge drive unit 80 of the present example is configured to press the stem 12 with the pressing unit 10 without the buffer unit 20 intervening.

The buffer unit 20 is provided coupled to the support unit 47 on the bottom side of the aerosol container 150. The buffer unit 20 is configured to buffer the excess force exerted on the aerosol container 150 by moving the aerosol container 150 according to the excess force. The buffer unit 20 of the present example is compressed by the force from the aerosol container 150 when the excess force is generated, thereby moving the aerosol container 150 toward the positive side in the X-axis direction. In this way, even when the buffer unit 20 is provided on the bottom side of the aerosol container 150, the discharge apparatus 100 can buffer the excess force, similarly to the case where the aerosol container 150 is provided on the stem side. Note that, the buffer unit 20 of the present example has a compression spring as the buffer elastic part 21, but may also have a material such as elastic rubber.

FIG. 7A illustrates one example of the configuration of the discharge apparatus 100 including a drive mechanism accommodation unit 86. The discharge apparatus 100 of the present example may not include the container retaining unit 40. The discharge drive unit 80 of the present example is arranged on the stem side of the aerosol container 150, and is configured to generate the drive force from the stem side toward the bottom side of the aerosol container 150.

The drive mechanism accommodation unit 86 is configured to accommodate the discharge drive unit 80 and the pressing unit 10. The drive mechanism accommodation unit 86 is configured to accommodate the buffer unit 20, but may be configured not to accommodate the aerosol container 150. The drive mechanism accommodation unit 86 is fixed to the aerosol container 150. The drive mechanism accommodation unit 86 of the present example is fixed to a clinched part of the mounting cup 156 of the aerosol container 150.

FIG. 7B illustrates a modified embodiment of the discharge apparatus 100 including the drive mechanism accommodation unit 86. The drive mechanism accommodation unit 86 of the present example is configured to clamp the body of the aerosol container 150 by a clamping part 87. The drive mechanism accommodation unit 86 of the present example is fixed to the aerosol container 150 by force of clamping the aerosol container 150 with the clamping part 87. The drive mechanism accommodation unit 86 may be fixed to the aerosol container 150 with an adhesive or the like.

FIG. 8 illustrates one example of a configuration of an unmanned aircraft 200 to which the discharge apparatus 100 is mounted. The unmanned aircraft 200 is a flying vehicle configured to fly in the air. The unmanned aircraft 200 of the present example includes the discharge apparatus 100, a body unit 210, and a propelling unit 220. The discharge apparatus 100 of the present example includes a coupling unit 110 for coupling with the unmanned aircraft 200.

The body unit 210 is configured to store various control circuits, a power supply, and the like of the unmanned aircraft 200. The body unit 210 may also be configured to function as a structure that couples components of the unmanned aircraft 200 each other. The body unit 210 of the present example is coupled to the propelling unit 220. The body unit 210 may include a camera.

The propelling unit 220 is configured to propel the unmanned aircraft 200. The propelling unit 220 has a rotary blade 221 and a rotation drive unit 222. The unmanned aircraft 200 of the present example includes four propelling units 220. The propelling unit 220 is attached to the body unit 210 via an arm unit 224. Note that, the unmanned aircraft 200 may be a flying vehicle including a fixed blade.

The propelling unit 220 is configured to generate propulsion force through rotation of the rotary blade 221. While four rotary blades 221 are provided around the body unit 210, the method of arranging the rotary blades 221 is not limited to this example. The rotary blade 221 is provided on a tip end of the arm unit 224 via the rotation drive unit 222.

The rotation drive unit 222 has a power source such as a motor and is configured to drive the rotary blade 221. The rotation drive unit 222 may have a brake mechanism for the rotary blade 221. The rotary blade 221 and the rotation drive unit 222 may be attached directly to the body unit 210 without the arm unit 224.

The arm unit 224 is provided extending radially from the body unit 210. The unmanned aircraft 200 of the present example includes four arm units 224 provided corresponding to the four propelling units 220. The arm unit 224 may be either fixed or movable. The arm unit 224 may have other configurations such as a camera fixed thereto.

The coupling unit 110 is configured to couple the container retaining unit 40 to a fixing part provided outside. The coupling unit 110 of the present example is configured to couple the container retaining unit 40 to the body unit 210 as a fixing part. The coupling unit 110 may be fixed or movable. The coupling unit 110 may be a gimbal for controlling a position of the discharge apparatus 100 in three axial directions. The coupling unit 110 may be configured to control a direction of the discharge apparatus 100 in tune with a discharge direction of the discharge apparatus 100.

Note that, when the standards of the coupling unit 110 are unified, it is possible to replace an arbitrary container retaining unit 40 adapted to the aerosol container 150. This makes it possible to correspond to the aerosol containers 150 of different sizes or types.

A leg unit 215 is coupled to the body unit 210 and is configured to keep a posture of the unmanned aircraft 200 during landing. The leg unit 215 is configured to keep the posture of the unmanned aircraft 200 while the propelling units 220 are turned off. The unmanned aircraft 200 of the present example has two leg units 215. A camera or discharge apparatus 100 may be attached to the leg unit 215.

By buffering the excess force with the buffer unit 20, the discharge apparatus 100 of the present example can safely discharge the contents even when the aerosol container 150 expands while the unmanned aircraft 200 is in flight. In addition, in the discharge apparatus 100 of the present example, the aerosol container 150 can be easily replaced even when the aerosol container 150 becomes empty.

FIG. 9 illustrates a modified embodiment of the discharge apparatus 100. The discharge apparatus 100 of the present example includes a container retaining unit 40 having a structure different from that of the embodiment of FIG. 1A. FIG. 9 illustrates states before and after discharging the contents from the aerosol container 150. Although the discharge apparatus 100 of the present example is one example of a stationary discharge apparatus, it may also be movable.

The container retaining unit 40 is configured to retain the aerosol container 150. The container retaining unit 40 of the present example is configured to retain the pressing unit 10 and the bottom surface of the aerosol container 150. The discharge drive unit 80 is provided on the bottom side of the aerosol container 150 and is configured to generate the drive force from the bottom side toward the stem side of the aerosol container 150. The support part 84 is configured to move the aerosol container 150 upward by moving up from the container retaining unit 40. Thereby, the discharge apparatus 100 presses the stem 12 with the pressing unit 10 to discharge the contents in the aerosol container 150. The buffer unit 20 of the present example is provided on the bottom side of the aerosol container 150, but may also be provided on the stem side of the aerosol container 150.

While the embodiments of the present invention have been described, the technical scope of the invention is not limited to the above-described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10: pressing unit, 12: stem, 14: stem elastic part, 16: gap, 20: buffer unit, 21: buffer elastic part, 22: fixing part, 24: buffer structure, 25: snap lock, 26: suppression mechanism, 40: container retaining unit, 41: first accommodation member, 42: second accommodation member, 43: convex part, 44: retaining part, 46: exposure prevention part, 47: support part, 50: discharge unit, 80: discharge drive unit, 81: cam, 82: cam follower, 83: movable part, 84: support part, 85: motor, 86: drive mechanism accommodation unit, 87: clamping part, 100: discharge apparatus, 110: coupling unit, 150: aerosol container, 152: dip tube, 154: housing, 156: mounting cup, 158: gasket, 200: unmanned aircraft, 210: body unit, 215: leg unit, 220: propelling unit, 221: rotary blade, 222: rotation drive unit, 224: arm unit.

What is claimed is:

1. A discharge apparatus to which an aerosol container can be detachably mounted, the discharge apparatus comprising:
a pressing unit configured to press a stem for opening and closing a valve of the aerosol container;
a buffer unit configured to buffer excess force, which is an amount of force by which force with which the pressing unit presses the stem has exceeded force to open the valve; and,
a container retaining unit for retaining the aerosol container, wherein the container retaining unit comprises:
a first accommodation member for accommodating one end of the aerosol container, and
a second accommodation member coupled to the first accommodation member and for accommodating another end of the aerosol container, and
the buffer unit is configured to couple the first accommodation member and the second accommodation member and to buffer the excess force by varying relative positions of the first accommodation member and the second accommodation member according to the excess force.

2. The discharge apparatus according to claim 1, wherein the buffer unit is configured to buffer the excess force exerted on the pressing unit by moving the pressing unit according to the excess force.

3. The discharge apparatus according to claim 1, wherein the buffer unit is configured to buffer the excess force exerted on the aerosol container by moving the aerosol container according to the excess force.

4. The discharge apparatus according to claim 1, comprising
an exposure prevention part configured to prevent exposure of an inside of the container retaining unit from between the first accommodation member and the second accommodation member.

5. The discharge apparatus according to claim 1, wherein the buffer unit comprises a snap lock with an elastic part attached to the container retaining unit.

6. The discharge apparatus according to claim 1, wherein the pressing unit is coupled to the first accommodation member, and
a discharge drive unit for driving the aerosol container is coupled to the second accommodation member.

7. The discharge apparatus according to claim 1, comprising a coupling unit for coupling the container retaining unit to a fixing part.

8. The discharge apparatus according to claim 1, wherein the buffer unit comprises a buffer elastic part for buffering the excess force.

9. The discharge apparatus according to claim 8, comprising
a preload mechanism configured to apply preload to the buffer elastic part.

10. The discharge apparatus according to claim 1, comprising
a discharge drive unit configured to supply drive force for discharging contents from the aerosol container, wherein
the excess force is generated by the drive force.

11. The discharge apparatus according to claim 1, wherein the buffer unit is provided outside an outer circumference of the aerosol container in a side view along a major axis of the aerosol container.

12. An unmanned aircraft comprising the discharge apparatus according to claim 1.

* * * * *